US010366149B2

United States Patent
Wolfram et al.

(10) Patent No.: US 10,366,149 B2
(45) Date of Patent: Jul. 30, 2019

(54) MULTIMEDIA PRESENTATION AUTHORING TOOLS

(71) Applicant: WOLFRAM RESEARCH, INC., Champaign, IL (US)

(72) Inventors: Stephen Wolfram, Concord, MA (US); Andre Kuzniarek, Champaign, IL (US)

(73) Assignee: Wolfram Research, Inc., Champaign, IL (US)

( * ) Notice: Subject to any disclaimer, the term of this patent is extended or adjusted under 35 U.S.C. 154(b) by 839 days.

(21) Appl. No.: 14/216,652

(22) Filed: Mar. 17, 2014

(65) Prior Publication Data

US 2014/0281852 A1    Sep. 18, 2014

Related U.S. Application Data

(60) Provisional application No. 61/798,457, filed on Mar. 15, 2013.

(51) Int. Cl.
*G06F 17/00* (2019.01)
*G06F 17/24* (2006.01)
(Continued)

(52) U.S. Cl.
CPC .............. *G06F 17/24* (2013.01); *G06F 16/40* (2019.01); *G06F 16/739* (2019.01);
(Continued)

(58) Field of Classification Search
CPC .. G06F 17/24; G06F 17/3089; G06F 17/2247; G06F 17/211–17/212;
(Continued)

(56) References Cited

U.S. PATENT DOCUMENTS 6,005,560 A * 12/1999 Gill .................... G06F 17/24
715/205
6,687,878 B1 * 2/2004 Eintracht .............. G06F 17/241
707/E17.117
(Continued)

FOREIGN PATENT DOCUMENTS

WO    WO 2010146558 A1 * 12/2010 ............. G06Q 30/02

OTHER PUBLICATIONS

PowerShow, Oct. 2011 https://web.archive.org/web/20111026075812/http://officeone.mvps.org/powershow/powershow.html https://web.archive.org/web/20111020132241/http://officeone.mvps.org/powershow/powershow_session_controller.html https://web.archive.org/web/20111021063135/http://officeone.mvps.org/powershow/tips_control_2pres_3monitors.html.*
(Continued)

*Primary Examiner* — Cesar B Paula
*Assistant Examiner* — David Faber
(74) *Attorney, Agent, or Firm* — Drinker Biddle & Reath LLP

(57) ABSTRACT

A multimedia presentation system facilitates efficient creation of multimedia presentations. For example, in an embodiment, a multimedia presentation system provides tools for creating an authoring notebook via which a user can (i) create graphics to be used in a presentation, (ii) create a script to be read, or be referred to, by a speaker during the presentation, and (iii) provide prompts to the speaker for when and/or how to modify the graphics during the presentation. A controller may be provided to allow a user to modify the visual portion of the presentation during performance of the presentation.

12 Claims, 9 Drawing Sheets

(51) Int. Cl.
| | |
|---|---|
| *G06F 17/21* | (2006.01) |
| *G06F 17/22* | (2006.01) |
| *G06F 16/40* | (2019.01) |
| *G06F 16/738* | (2019.01) |
| *G06F 16/958* | (2019.01) |
| *G06F 16/955* | (2019.01) |
| *G06Q 10/10* | (2012.01) |
| *H04N 21/43* | (2011.01) |

(52) U.S. Cl.
CPC ........ *G06F 16/958* (2019.01); *G06F 16/9558* (2019.01); *G06F 17/211* (2013.01); *G06F 17/212* (2013.01); *G06F 17/2247* (2013.01); *G06Q 10/10* (2013.01); *H04N 21/4307* (2013.01)

(58) Field of Classification Search
CPC ......... G06F 17/30882; G06F 17/30017; G06F 17/30843; G06F 3/0489; G06Q 10/10; G11B 27/034; G11B 27/34; H04N 21/2368; H04N 21/4307; H04N 21/4341
See application file for complete search history.

(56) References Cited

U.S. PATENT DOCUMENTS

| | | | | |
|---|---|---|---|---|
| 7,240,287 | B2* | 7/2007 | Qureshi | G06F 3/0481 345/2.2 |
| 8,533,268 | B1* | 9/2013 | Vernon | G06Q 10/10 709/205 |
| 9,026,915 | B1* | 5/2015 | Ehlen | G06F 17/30781 715/728 |
| 9,959,260 | B2* | 5/2018 | Ehlen | G06F 17/30781 |
| 2002/0165747 | A1* | 11/2002 | Shriver | G06Q 10/06 705/301 |
| 2004/0130566 | A1* | 7/2004 | Banerjee | G06F 17/30017 715/716 |
| 2004/0145603 | A1* | 7/2004 | Soares | G06F 17/30017 715/730 |
| 2004/0205515 | A1* | 10/2004 | Socolow | G06F 17/24 715/202 |
| 2005/0039119 | A1* | 2/2005 | Parks | G06F 17/211 715/209 |
| 2005/0091598 | A1* | 4/2005 | Schmonsees | G06F 17/30056 715/732 |
| 2006/0036593 | A1* | 2/2006 | Dean | G06F 17/3061 |
| 2006/0277454 | A1* | 12/2006 | Chen | G06F 17/30056 715/203 |
| 2007/0294619 | A1* | 12/2007 | Krishnaswamy | G06F 17/211 715/704 |
| 2008/0126953 | A1* | 5/2008 | Davidson | G06Q 10/10 715/753 |
| 2009/0172559 | A1* | 7/2009 | Waldman | G06F 17/211 715/744 |
| 2009/0265649 | A1* | 10/2009 | Schlossberg | G06Q 30/02 715/769 |
| 2012/0300080 | A1* | 11/2012 | Batson | H04N 21/23412 348/159 |
| 2015/0234800 | A1* | 8/2015 | Ehlen | G06F 17/24 715/202 |

OTHER PUBLICATIONS

Microsoft Support 2016 https://support.office.com/en-us/article/Create-or-edit-a-hyperlink-5d8c0804-f998-4143-86b1-1199735e07bf?ui=en-US&rs=en-US&ad=US.*

Microsoft Support 2016 https://support.office.com/...-presentation-9d563906-5ca1-4c54-aa05-9ff7de4b455a?CorrelationId=7ca47a26-db38-4a1e-9ba1-56fe7e0c4f34.*

Techwalla 2016 https://www.techwalla.com/articles/how-to-open-a-hyperlink-in-powerpoint.*

Penn Libraries, Jul. 18, 2013 http://gethelp.library.upenn.edu/workshops/biomed/ppt07/hyperlinks07.html.*

Penn Libraries, Jul. 18, 2013 http://gethelp.library.upenn.edu/workshops/biomed/ppt07/slideshow07.html.*

Microsoft Support "View your speaker notes privately, while delivering a presentation on multiple monitors", PowerPoint 2007, https://support.office.com/en-US/article/View-your-speaker-notes-privately-while-delivering-a-presentation-on-multiple-monitors-ccfa1894-e3ef-4955-9c3a-444d58248093#OfficeVersion=2007.*

Applied Office "applied tips: Apr. 2009: microsoft powerpoint : using slide/speaker notes", 2009, p. 1-2.* fppt.com, "How to Insert a Link in Notes Page of a PowerPoint 2010 presentations", 5 pages, online since Oct. 2, 2012 https://web.archive.org/web/20121002002637/http://www.free-power-point-templates.com/articles/how-to-insert-a-link-in-notes-page-of-a-powerpoint-2010-presentations.*

Amazon.com, "Microsoft PowerPoint 2007 [Old Version]", Aug. 7, 2006 https://www.amazon.com/Microsoft-PowerPoint-2007-Old-Version/dp/B000HCVR44.*

Microsoft PowerPoint 2003, Microsoft, SS0-10, 11 pages.*

* cited by examiner

MULTIMEDIA PRESENTATION AUTHORING TOOLS

CROSS-REFERENCE TO RELATED APPLICATION

This application claims the benefit of U.S. Provisional Patent Application No. 61/798,457, entitled "Multimedia Presentation Authoring Tools," filed on Mar. 15, 2013, which is incorporated by reference herein in its entirety.

FIELD OF THE DISCLOSURE

The present disclosure relates generally to multi-media presentations and, more particularly, to tools for authoring and/or generating multi-media presentations.

BACKGROUND

Graphical slides, such as those created with Microsoft PowerPoint® software, are commonly used as visual aids by speakers when giving a presentation. A video of a presentation that shows the slides as presented and includes an audio recording of the speaker allows the presentation to be made available to a larger audience and may make the presentation available on-demand. Also, companies and individuals often create videos to explain how to use a tool or device, explain features of a product, etc. As an example, a screencast may be made to explain how features of a software product can be utilized. Such videos may be made available to wide audiences through video sharing services such as YouTube®.

SUMMARY

In various embodiments, a multimedia presentation system facilitates efficient creation of multimedia presentations. For example, in an embodiment, a multimedia presentation system provides tools for creating an authoring notebook via which a user can (i) create and/or specify visual information to be used in a presentation, (ii) create a script to be read, or be referred to, by a speaker during the presentation, and (iii) provide prompts to the speaker (or some other person) for when and/or how to modify the visual information during the presentation (e.g., when to advance a slide, what button to press (and when to press it) on a controller that controls display of visual data during the presentation, etc.). The visual information (or references to the visual information), the script, and the prompts may be commingled and positioned within the authoring notebook to facilitate synchronization of the display of visual information, modification of the visual information, and the words of the speaker during the presentation.

In some embodiments, a multimedia presentation system provides tools to facilitate performing the multimedia presentation, such as in front of a live audience and/or for purposes of recording a video of the presentation. For example, in an embodiment, a multimedia presentation system provides tools for generating, with an authoring notebook such as described above, (i) a graphical presentation that can be visually rendered during performance of the presentation, and (ii) a script to be read and/or be referred to by a speaker during the performance of the presentation. A controller may be provided to allow the graphical presentation to be modified during the presentation. For example, the controller may include one or more user interface mechanisms (e.g., buttons) to permit a user (e.g., the speaker or an assistant) to advance a slide in the graphical presentation, to cause text or graphics to be visually rendered, etc. The script may include the prompts to the speaker (or an assistant) for when and/or how to modify the graphics during the presentation (e.g., when to advance a slide, what button to press (and when to press it) on the controller, etc.). In some embodiments, the controller may provide user interface mechanisms (e.g., buttons) to permit a user (e.g., the speaker or an assistant) to advance the script during performance of the presentation.

DETAILED DESCRIPTION

In various embodiments described below, a multimedia presentation system facilitates efficient creation of multimedia presentations. For example, in an embodiment, a multimedia presentation system provides tools for creating an authoring notebook via which a user can (i) create graphics to be used in a presentation, (ii) create a script to be read, or be referred to, by a speaker during the presentation, and (iii) provide prompts to the speaker (or some other person) for when and/or how to modify the graphics during the presentation (e.g., when to advance a slide, what button to press (and when to press it) on a controller that controls graphics during the presentation, etc.). The graphics (or references to the graphics), the script, and the prompts may be commingled and positioned within the authoring notebook to facilitate synchronization of the graphics, modification of the graphics, and the words of the speaker during the presentation.

In some embodiments, a multimedia presentation system provides tools to facilitate performing the multimedia presentation, such as in front of a live audience and/or for purposes of recording a video of the presentation. For example, in an embodiment, a multimedia presentation system provides tools for generating, with an authoring notebook such as described above, (i) a graphical presentation that can be visually rendered during performance of the presentation, and (ii) a script to be read and/or be referred to by a speaker during the performance of the presentation. A controller may be provided to allow the graphical presentation to be modified during the presentation. For example, the controller may include one or more user interface mechanisms (e.g., buttons) to permit a user (e.g., the speaker or an assistant) to advance a slide in the graphical presentation, to cause text or graphics to be visually rendered, etc. The script may include the prompts to the speaker (or an assistant) for when and/or how to modify the graphics during the presentation (e.g., when to advance a slide, what button to press (and when to press it) on the controller, etc.). In some embodiments, the controller may provide user interface mechanisms (e.g., buttons) to permit a user (e.g., the speaker or an assistant) to advance the script during performance of the presentation.

Figure 1:
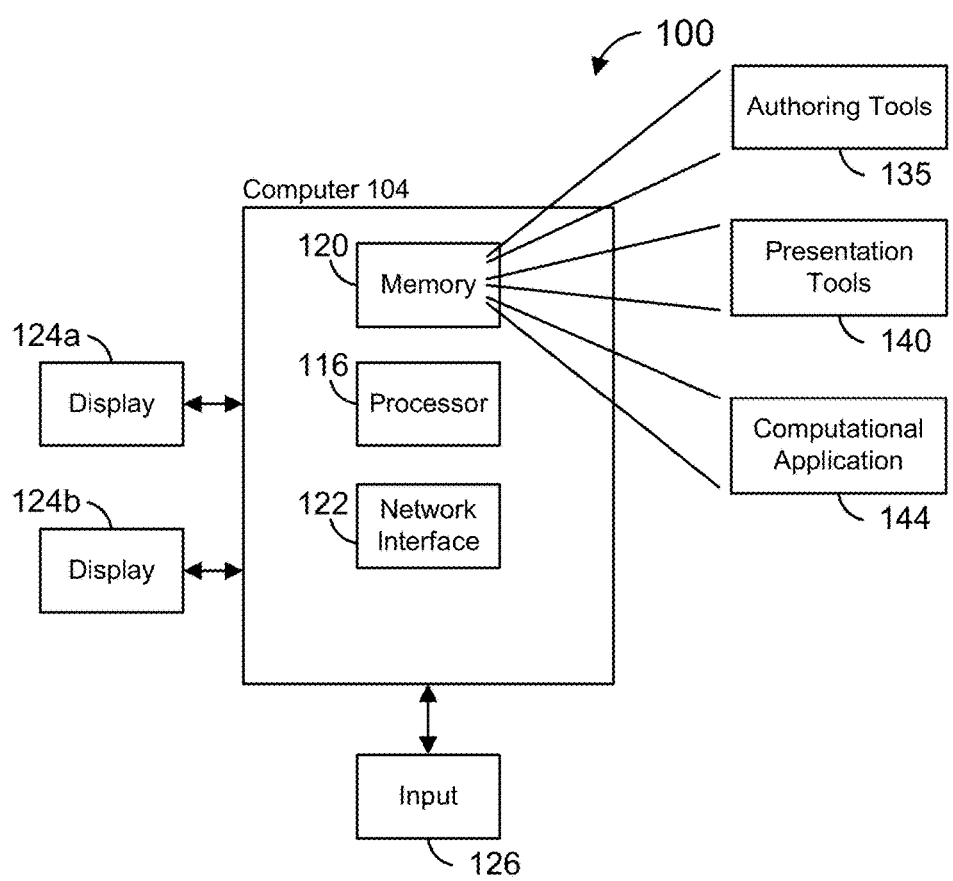
FIG. 1 a block diagram of an example computing device configured to implement multimedia presentation authoring and/or performance tools such as described herein, in an embodiment.

FIG. 1 is a diagram of an example system 100 which may implement an example multimedia presentation system, according to an embodiment. The system 100 includes a computer 104, which may comprise a computing device such as a desktop computer, a gaming system, a tablet computer, a smart phone, etc. The computer 104 may include one or more processors 116 (e.g., a CPU and/or a graphics processor), one more memory devices 120 (e.g., random access memory (RAM), read only memory (ROM), FLASH memory, a magnetic disk, an optical disk, etc.), and a network interface 122 to communicatively couple the computer 104 to a communication network (not shown). The computer 104 is communicatively coupled to, or includes, one or more display devices 124 (e.g., external display device(s) and/or integral display device(s), and one or more input devices 126, such as a keyboard, a keypad, a button, a mouse, a trackball, a touch screen, a multi-touch screen, a touch pad, etc. At least some of the one or more processors 116, the one or more memory devices 120, the network interface 122, the one or more display devices 124, and the one or more input devices 126 may be communicatively coupled together via one or more busses (not shown), cords (not shown), etc.

The one or more memory devices 120 may store an authoring tools module 135 for facilitating creation of a multimedia presentation, in some embodiments. The authoring tools module 135, when executed by the one or more processors 116, may provide a user interface and tools for (i) creating graphics to be used in a presentation, (ii) creating a script to be read, or be referred to, by a speaker during the presentation, and (iii) providing prompts to the speaker (or an assistant) for when and/or how to modify the graphics during the presentation (e.g., when to advance a slide, what button to press (and when to press it) on a controller that controls graphics during the presentation, etc.).

Additionally, the one or more memory devices 120 may store a presentation tools module 140 for facilitating a performance of a multimedia presentation, in some embodiments. The presentation tools module 140, when executed by the one or more processors 116, may provide a user interface and tools for generating (i) a graphical presentation that can be visually rendered during performance of the multimedia presentation, and (ii) a script to be read and/or to be referred to by a speaker during the performance of the multimedia presentation. In some embodiments, the presentation tools module 140 may include a controller, having user interface mechanisms (e.g., buttons), to permit a user (e.g., the speaker or an assistant) to allow the graphical presentation to be modified during the presentation and/or to advance the script during performance of the presentation.

Further, the one or more memory devices 120 may store a computational application 144 configured to evaluate functions, expressions, etc., and present results of the evaluation, in some embodiments. In some embodiments including a computational application 144, a multimedia presentation may include (i) functions, expressions, etc., capable of being evaluated by the computational application 144, and/or results of evaluations of functions, expressions, etc., by the computational application 144. The computational application 144, when executed by the one or more processors 116, may interact with the authoring tools module 135 and/or the presentation tools module 140 so that a user can include functions, expressions, etc., and/or evaluations of such functions, expressions, etc., in the multimedia presentation. Examples of computational applications 144 that may be utilized include Mathematica® from Wolfram Research, Inc., a spreadsheet application, etc.

In other embodiments, other applications (in addition to or as an alternative of the computational application 144) may be stored in the one or more memory devices 120 and utilized to provide content for a multimedia presentation. Examples of such other applications include web browser applications, applications for creating drawings and/or diagrams, applications for creating 3-dimensional models (e.g., for architectural, civil, mechanical, video game, etc., design), applications for software development, etc.

Examples herein are described in the context of the Mathematica® application for explanatory and illustrative purposes. In other embodiments, however, other applications besides Mathematica® may be utilized, such as example applications described above or other suitable applications that can be utilized to generate content for a multimedia presentation.

Figure 2:
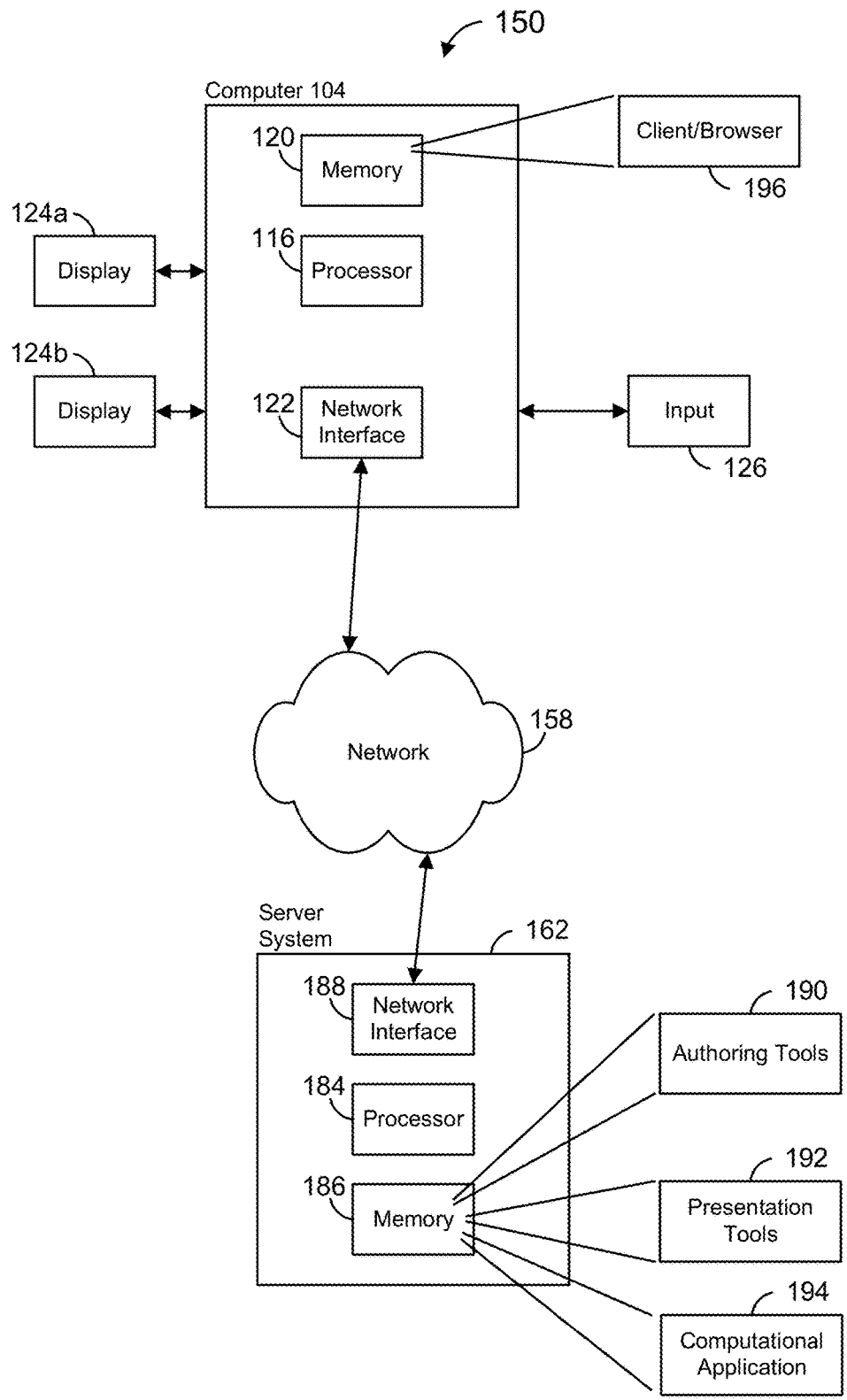
FIG. 2 a block diagram of an example system configured to implement multimedia presentation authoring and/or performance tools such as described herein, in an embodiment.

FIG. 2 is a diagram of another example system 150 which may implement an example multimedia presentation system, according to another embodiment. The system 150 includes the computer 104 of FIG. 1, which is communicatively coupled to a server system 162 via a network 158, which includes, for example, one or more of the Internet, an intranet, an extranet, a mobile communications network, etc. In the system 150, the computer 104 is configured to implement a multimedia presentation system in conjunction with the server system 162, in an embodiment.

The server system 162 may comprise one or more computing devices such as a desktop computer, a server, a mainframe, etc. The server system 162 may include one or more processors 184, one more memory devices 186 (e.g., RAM, ROM, FLASH memory, a magnetic disk, an optical disk, a database system, etc.), and a network interface 188 to communicatively couple the server system 162 to the network 158. At least some of the one or more processors 184, the one or more memory devices 186, and the network interface 188 may be communicatively coupled together via one or more of 1) one or more busses, 2) one or more networks (e.g., a local area network (LAN), a wide area network (WAN), etc.) 3) point-to-point communication links, 4) cords, etc. (not shown).

The one or more memory devices 186 may store an authoring tools module 190 that, when executed by the one or more processors 184, facilitates creation of a multimedia presentation, in some embodiments. Additionally, the one or more memory devices 186 may store a presentation tools module 192 that, when executed by the one or more processors 184, facilitates performing a multimedia presentation, in some embodiments. Further, the one or more memory devices 120 may store a computational application 194 such as described above.

In other embodiments, other applications (in addition to or as an alternative of the computational application 194) may be stored in the one or more memory devices 120 and utilized to provide content for a multimedia presentation. Examples of such other applications include web browser applications, applications for creating drawings and/or diagrams, applications for creating 3-dimensional models (e.g., for architectural, civil, mechanical, video game, etc., design), applications for software development, etc.

The one or more memory devices 120 of the computer 104 may store a web browser or client application 196 that interacts with the authoring tools module 190, the presentation tools module 192, and/or the computational application 194 (or another suitable application) implemented by the server system 162, in some embodiments. The web browser or client application 196 may include a front end module configured to interact with the authoring tools module 190, the presentation tools module 192, and/or the computational application 194 (or another suitable application) implemented by the server system 162, in an embodiment.

The computer 104 is configured to communicate with the server system 162 via the network 158, and the web browser or client application 196 is configured to interact with the authoring tools module 190, the presentation tools module 192, and/or the computational application 194 (or another suitable application) implemented by the server system 162 to provide a front end and/or client for the authoring tools module 190, the presentation tools module 192, and/or the computational application 194 (or another suitable application), in an embodiment.

In an embodiment, the authoring tools module 135 and/or the authoring tools module 190 are configured to provide a user interface and/or tools for creating an authoring notebook via which a user can (i) create graphics to be used in a presentation, (ii) create a script to be read, or be referred to, by a speaker during the presentation, and/or (iii) provide prompts to the speaker (or some other person) for when and/or how to modify the graphics during the presentation (e.g., when to advance a slide, what button to press (and when to press it) on a controller that controls graphics during the presentation, etc.).

Figure 3:
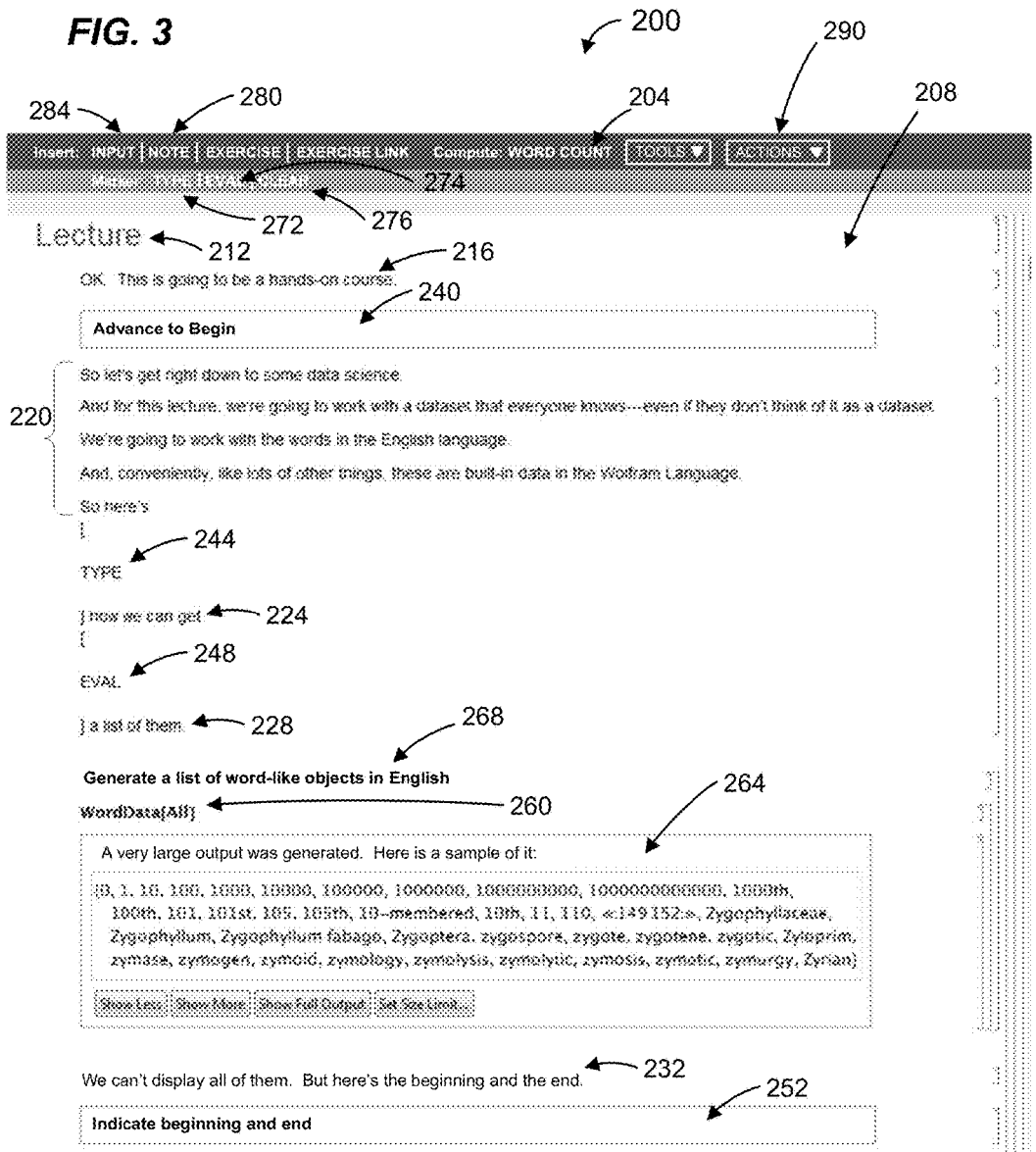
FIG. 3 is a diagram illustrating an example multimedia presentation authoring notebook, according to an embodiment.

In some embodiments, the authoring tools module 135 and/or the authoring tools module 190 include an authoring notebook editor configured to permit a user to create and/or edit authoring notebooks. FIG. 3 is an illustration of an example user interface display 200 generated by an authoring notebook editor, according to an embodiment. The display 200 includes a first area 204 that includes user interface mechanisms for invoking menus, menu items, tools, inserting data into a notebook, etc. The display 200 also includes a second area 208, e.g., a working area 208, that displays an authoring notebook being edited. In FIG. 3, only a portion of an example authoring notebook is illustrated.

An authoring notebook may include headings to assist with organization of the authoring notebook, in some embodiments. For example, in the example illustrated in FIG. 3, the authoring notebook includes a header 212 ("Lecture"). Headings may be added to an authoring notebook by a user and/or default headings may be included in notebook templates used to create new authoring notebooks.

An authoring notebook may include text that corresponds to a script to be read and/or referenced by a speaker during a performance of the presentation, in some embodiments. For example, the authoring notebook illustrated in FIG. 3 includes text corresponding to a script such as text 216, 220, 224, 228, and 232.

An authoring notebook may also include text, markers, and/or other types of indicators that indicate to the speaker (or an assistant) actions that should be taken during performance of the presentation, in some embodiments. Example types of indicators include (i) indicators that prompt the speaker (or an assistant) to take an action should be taken to modify a corresponding graphical display during performance of the presentation (e.g., "advance to next slide," "press the 'EVAL' button on the controller," etc.), and/or (ii) indicators that prompt the speaker (or an assistant) to take an action not necessarily related to modifying the graphical display (e.g., "Pause for 5 seconds," "Raise the pitch of your voice when reading the next line," "Move your mouse to show the beginning and end of the list," etc.). Such indicators may be made to be easily distinguishable from script text to make it clear to the speaker that the indicators are not part of the script text. For example, such indicators may be set apart from the script text, highlighted, in a different color, in a different size, in a different font, etc., as compared to script text.

For example, the authoring notebook illustrated in FIG. 3 includes a note 240 ("Advance to Begin"). The note 240 is an instruction to the speaker (or an assistant) to take an action during performance of the presentation. In particular, the note 240 is an instruction to the speaker (or an assistant) to advance a graphical display to a first slide. The note 240 may be surrounded by a box and/or in a different color than the script text to indicate to the speaker that the note 240 is not part of the script that is to be read during the presentation.

As another example, the authoring notebook illustrated in FIG. 3 includes a marker 244. The marker 244 is an instruction to the speaker (or an assistant) to press a "TYPE" button on a controller during the presentation, which will cause an expression to be displayed on a graphical display. Use of an example controller during a presentation and the "TYPE" button will be described in more detail below.

As another example, the authoring notebook illustrated in FIG. 3 includes a marker 248. The marker 248 is an instruction to the speaker (or an assistant) to press an "EVAL" button on the controller during the presentation, which will cause an evaluation of the expression (which was displayed on the graphical display in response to pressing the "TYPE" button) to be displayed on the graphical display. The "EVAL" button of an example controller will be described in more detail below.

In an embodiment, the markers TYPE and EVAL are set apart by brackets, as illustrated in FIG. 3. This may help to distinguish the markers from script text, for example.

As another example, the authoring notebook illustrated in FIG. 3 includes a note 252 ("Indicate beginning and end"). The note 252 is an instruction to the speaker (or an assistant) to take an action during performance of the presentation. In particular, the note 252 is an instruction to the speaker (or an assistant) to indicate, during the presentation, the beginning and end of a list that is displayed on the graphical display in response to pressing the "EVAL" button. For example, the speaker (or an assistant) may indicate the beginning and end of the list during the presentation by manually moving a pointer, a cursor, etc.

In another embodiment, a user may insert in the authoring notebook instructions for the presentation tools 140, 192 to automatically move a pointer, a cursor, etc. For example, a user may manually move the pointer, cursor, etc., and record the desired movement. Then, the recorded movement may be recreated by the presentation tools 140, 192 during the presentation. For example, a button on a controller may be configured to initiate the desired movement. Further, a prompt or indicator may be included in the authoring notebook to indicate when the speaker (or an assistant) should initiate the desired movement during the presentation (e.g., when to press the appropriate button on the controller). In another embodiment, a desired movement is indicated by coordinates on a display (e.g., coordinates of a starting location of the pointer, cursor, etc., and coordinates of an ending location of the pointer, cursor, etc.). For example, during creation of the authoring notebook, a user could manually move a cursor/pointer to a desired starting location and record the coordinates. Similarly, the user could manually move the cursor/pointer to a desired ending location and record the coordinates. In another embodiment, starting and ending coordinates could be manually entered by a user using, for example, expressions capable of being evaluated by the computational application 144/194. During the presentation, the presentation tools 140, 192 may be configured to move the cursor automatically on a display from the starting location to the ending location in response to an appropriate button press on the controller, for example, according to an embodiment.

In some embodiments, a user may insert in the authoring notebook instructions for the presentation tools 140, 192 to change a shape and/or a size of a pointer, a cursor, etc. For example, a button on a controller may be configured to initiate the desired change of shape, size, etc., of the pointer, a cursor, etc. Further, a prompt or indicator may be included in the authoring notebook to indicate when the speaker (or an assistant) should initiate the desired change during the presentation (e.g., when to press the appropriate button on the controller).

An authoring notebook may include text, graphical and/or video information, etc., that is to be rendered on a display device during a performance of the presentation, in some embodiments. An authoring notebook may include instructions for generating and/or retrieving from storage (and/or via a network such as the Internet, a local area network (LAN), a wide area network (WAN), etc.) text, graphical and/or video information that is to be rendered on a display device during a performance of the presentation, in some embodiments.

An authoring notebook may include instructions, functions, expressions, software source code, etc., for evaluation by a computational application or some other type of application such as an interpreter, a compiler, etc., where the result of the evaluation is to be rendered on a display device during a performance of the presentation, in some embodiments. For example, the authoring notebook illustrated in FIG. 3 includes an expression 260 capable of being evaluated by the computational application 144 and/or the computational application 194 (e.g., Mathematica®).

An authoring notebook may also include the results of evaluating such instructions, functions, expressions, etc. For example, the authoring notebook illustrated in FIG. 3 includes a result 264 of an evaluation of the expression 260 by the computational application 144 and/or the computational application 194 (e.g., Mathematica®).

In an embodiment, when an instruction, function, expression, software source code, etc., is inserted in the notebook, the authoring notebook may include a comment 268 (or a sub-heading, note, etc.) that may be utilized to provide a comment on, explanation of, etc., the instruction, function, expression, software source code, etc. The comment 268 is not intended to be included in the script or the visual component of the presentation, in an embodiment, and thus the comment 268 may be formatted, set apart, etc., from script text, markers, etc. For example, in the example illustrated in FIG. 3, the comment 268 is in a different color than the script text 220, 224, 228, the markers 244, 248, etc.

The visual content to be rendered on a display during the presentation (or references, instructions, expressions, etc., related to generating such content), the script, and the prompts may be commingled and positioned within the authoring notebook to facilitate synchronization of the visual content, instructions for modifying the visual content during the presentation, and the words of the speaker during the presentation. For example, the note 240 is "in line" with the script text 216 and 220 to indicate that the action "Advance to Begin" should be taken after the speaker says "This is going to be a hands-on course," and before the speaker says "So let's get right down to some data science." From a different point of view, the authoring notebook indicates that the speaker should say the sentence "So let's get right down to some data science," only after the action "Advance to Begin" is taken.

As another example, the markers 244 and 248 are disposed "in line" within the script sentence "So here's how we can get a list of them," to indicate that the actions "press the TYPE button," and "press the EVAL button," should be taken while the speaker reads the sentence "So here's how we can get a list of them."

Additionally, commingling and positioning of the visual content to be rendered on a display during the presentation (or references, instructions, expressions, etc., related to generating such content), the script, and the prompts may assist an author with planning and organizing the multimedia presentation, at least in some embodiments.

In other embodiments, script text, markers, notes, etc., may be disposed in separate columns, for example, in an authoring notebook where vertical alignment of script text, markers, notes, etc., across columns indicates time synchronization. As an illustrative example, the script text "So here's how we can get a list of them," could be in a first column, and the markers 244 and 248 could be in a second column and vertically aligned with the script text "So here's how we can get a list of them," to indicate that the actions "press the TYPE button," and "press the EVAL button," should be taken while the speaker reads the sentence "So here's how we can get a list of them."

In the illustrative authoring notebook depicted in FIG. 3, a direction down generally corresponds to increasing passage of time in the context of the presentation. For example, the script text 232, which is below the script text 220 in the notebook, will be read by the speaker at a time that occurs after the speaker reads the script text 220. As another example, the marker 244, which is above the marker 248, indicates a first action that will be taken at a time prior to when a second action associated with the marker 248 will be taken. Similarly, first visual data (e.g., text to be included in the visual component of the presentation, expressions to be evaluated, etc.) located above second visual data in the notebook, will be visually rendered (or will be evaluated to cause graphics/video to be rendered, for example) during the presentation at a time prior to when the second visual data is rendered (or is evaluated to cause graphics/video to be rendered, for example).

In other embodiments, a different direction in an authoring notebook may correspond to increasing passage of time, such as in a direction from left to right or another suitable direction.

To add information to the authoring notebook, a user may position a cursor to a desired location in the authoring notebook (e.g., using a mouse, a trackball, a touch screen, etc.) and then begin typing (e.g., using a keyboard, a keypad, a touch screen, etc.) and/or use user interface mechanisms to insert information (e.g., markers), select a type of information to be entered (e.g., script text, a note, an expression), etc.

For example, as discussed above, the first area 204 of the display 200 includes user interface mechanisms for invoking menus, menu items, tools, inserting information into the notebook, etc., according to an embodiment. A user interface mechanism 272, when selected, causes a TYPE marker to be inserted at a current location of the cursor. A user interface mechanism 272, when selected, causes a TYPE marker to be inserted at a current location of the cursor. A user interface mechanism 274, when selected, causes an EVAL marker to be inserted at the current location of the cursor. A user interface mechanism 276, when selected, causes a CLEAR marker to be inserted at the current location of the cursor.

A user interface mechanism 280, when selected, causes a note box to be inserted at the current location of the cursor, with default text (e.g., "Note") or no text. The cursor may be repositioned within the box so that the user can begin typing the desired note (e.g., "Advance to Begin").

A user interface mechanism 284 enables insertion of instructions, functions, expressions, software source code, etc., for evaluation by a computational application or some other type of application such as an interpreter, a compiler, a web browser, a file manager application, etc., where the result of the evaluation is to be rendered on a display device during a performance of the presentation, in some embodiments. For example, the user interface mechanism 284, when selected, causes a default comment (e.g., like comment 268) to be inserted at the current location of the cursor, and which the user can later modify. The cursor may be repositioned below the comment so that the user can begin typing the desired instruction, function, expression, software source code, etc., (e.g., "WordData[All]").

A result of an evaluation of the instruction, function, expression, software source code, etc., may also be included in the authoring notebook. For example, after entering the instruction, function, expression, software source code, etc., the user may cause the instruction, function, expression, software source code, etc., to be evaluated by taking an appropriate action such as pressing Enter, Shift-Enter, an appropriate function key, etc. After evaluation, the result may be included proximate to (e.g., below) the instruction, function, expression, software source code, etc., in an embodiment. Evaluation may be performed by the computational application 144 and/or the computational application 194 (e.g., Mathematica®, a spreadsheet application, etc.) or some other suitable application (e.g., a web browser, software development application, etc.).

Figure 4:
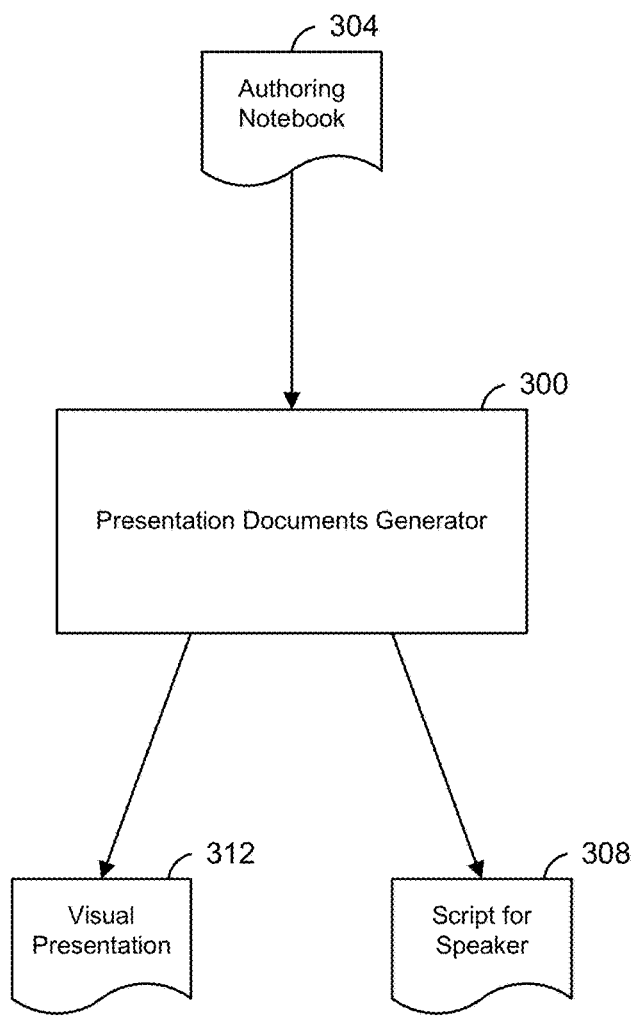
FIG. 4 is a diagram of illustrating operation of an example presentation documents generator, according to an embodiment.

After the authoring notebook is completed, e.g., using an authoring notebook editor such as described above, or another suitable authoring notebook editor, documents to be used for performance of the multimedia presentation may be generated by the presentation tools module 140 and/or the presentation tools module 192. FIG. 4 is a diagram illustrating operation of an example presentation documents generator 300 that may be included in the presentation tools module 140 and/or the presentation tools module 192, in some embodiments.

The presentation documents generator 300 is configured to, when executed by one or more processors, process an authoring notebook 304 to generate one or both of (i) a script file 308 that includes a script to be read or referenced by the speaker, and (ii) a visual presentation file 312 that includes visual data (e.g., text, graphics, video, etc., expressions to be evaluated, etc.) corresponding to a visual component of the multimedia presentation, according to an embodiment. The script file 308 may also include information (not part of the script) to prompt the speaker (or an assistant) to take certain actions during the presentation, where such information may include notes, markers, etc., that are not intended to be spoken by the speaker. The visual presentation file 312 includes visual data (e.g., text, graphics, video, etc., expressions to be evaluated, etc.) corresponding to a visual component of the multimedia presentation, according to an embodiment.

The presentation documents generator 300 may be configured to, when executed by one or more processors, extract a first set of information (e.g., speaker related information such as script text, markers, notes, etc.) from the authoring notebook to generate the script file 308. The presentation documents generator 300 may be configured to, when executed by one or more processors, extract a second set of information (e.g., visual information to be displayed or to instruct what information is to be displayed during the presentation) from the authoring notebook to generate the visual presentation file 312.

In some embodiments, the system may be configured to utilize a text-to-speech system (e.g., utilizing computer synthesized speech) generate audio corresponding to a reading of text from the script file 308. Additionally, the system may be configured to automatically take actions (e.g., button presses, cursor movements, etc.), indicated by markers in the script file 308.

Figure 5:
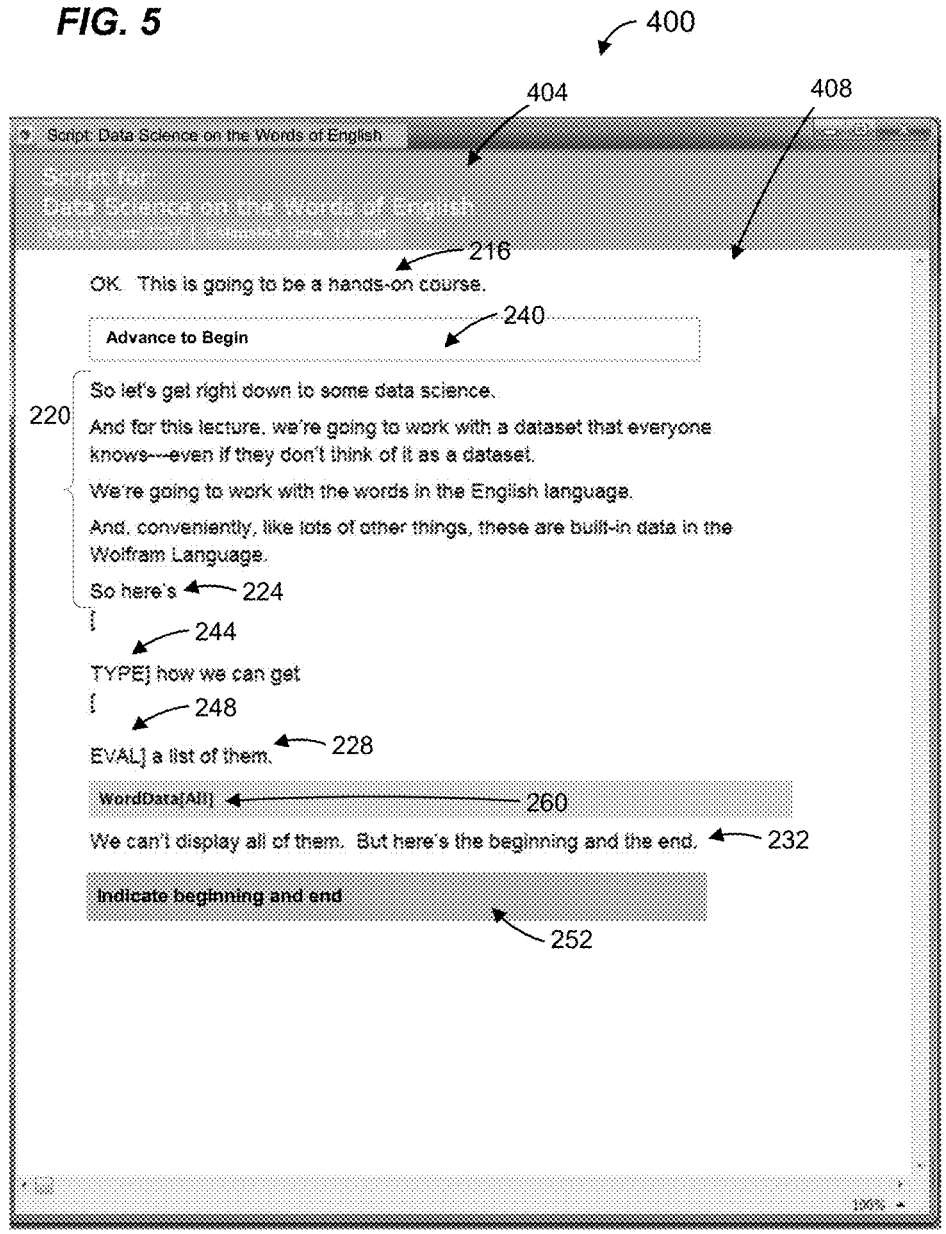
FIG. 5 is a diagram of an example display in which a script to read by a speaker is displayed, according to an embodiment.

FIG. 5 is an illustration of an example display 400 generated by the presentation tools module 140 and/or the presentation tools module 192, according to an embodiment. The display 400 is for displaying, during the presentation, a script file 308 that can be read by or referenced by a speaker during performance of the presentation.

The display 400 includes a first area 404 that includes metadata regarding the script file 308, such as a title, a number of words in the script, an estimated length of time of the presentation, etc. The display 400 also includes a second area 408 in which the script file is displayed. In FIG. 5, a portion of an example script file is illustrated, the portion corresponding to the portion of the example authoring notebook illustrated in FIG. 3.

In some embodiments, the script file is structured in pages or slides, and the pages or slides can be advanced during the presentation. In an embodiment, pages or slides of the script file can be advanced during the presentation using a controller, to be described in more detail below.

The script file may omit some items from the authoring notebook to improve readability of the script, in some embodiments. For example, comparing FIGS. 3 and 5, the heading 212, the comment 268, and the result 264 of the evaluation of the expression 260 is omitted. In other embodiments, fewer items or no items are omitted. In some embodiments, additional information is added, such as markers prompting the speaker (or an assistant) when to advance the page/slide of the script.

Figure 6A:
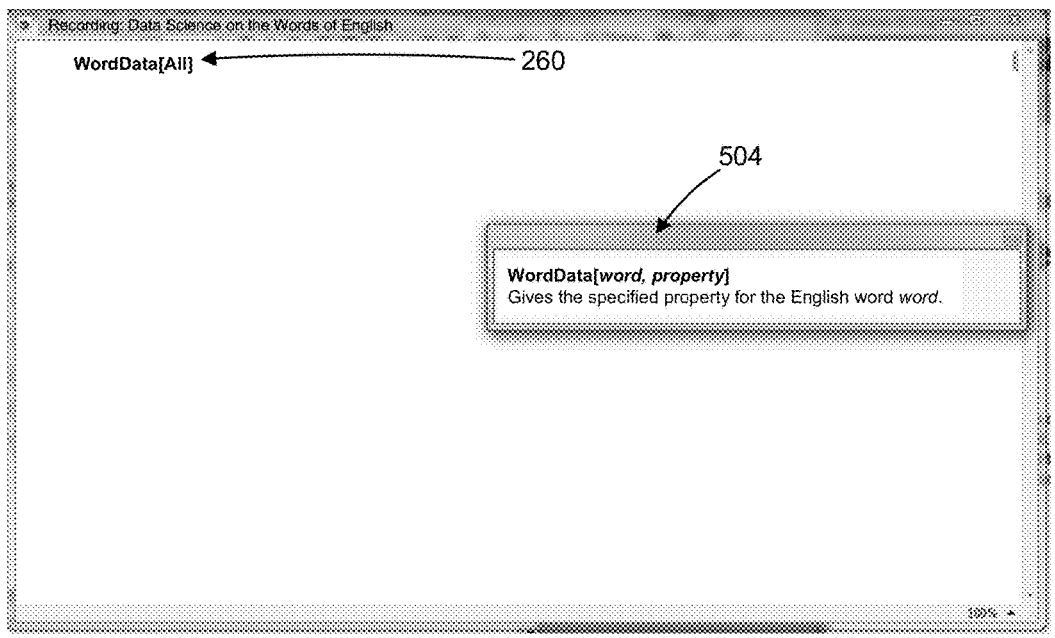
FIGS. 6A and 6B are illustrations of an example display of a visual portion of a multimedia presentation, according to an embodiment.
Figure 6B:
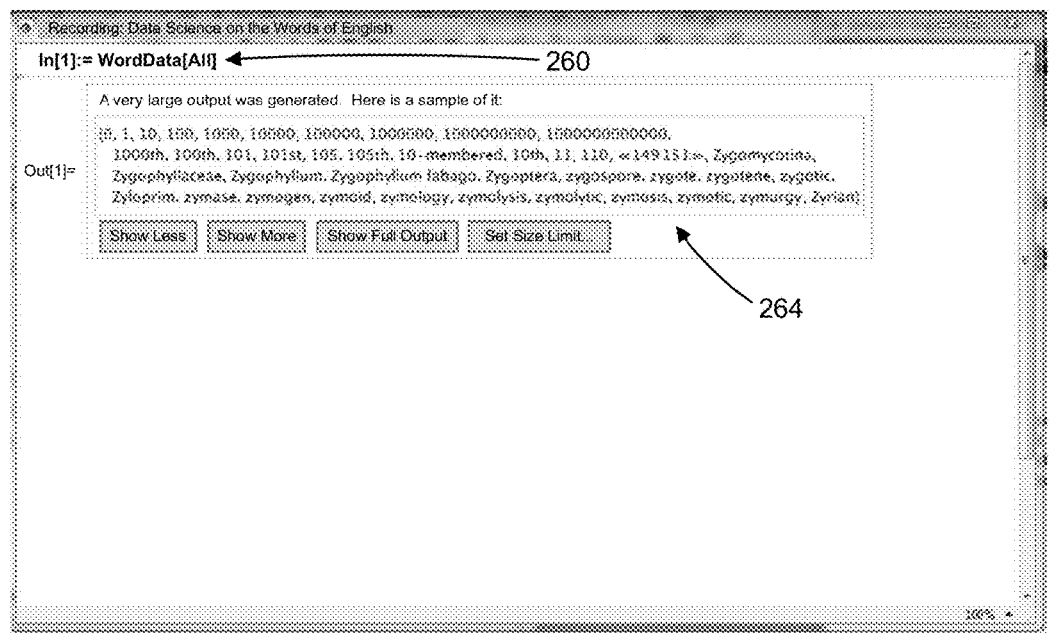

FIGS. 6A and 6B are illustrations of an example presentation display 500 generated by the presentation tools module 140 and/or the presentation tools module 192, according to an embodiment. The presentation display 500 is for displaying visual content during the multimedia presentation, and in particular, displaying a visual presentation file 308 during performance of the presentation.

Figure 7:
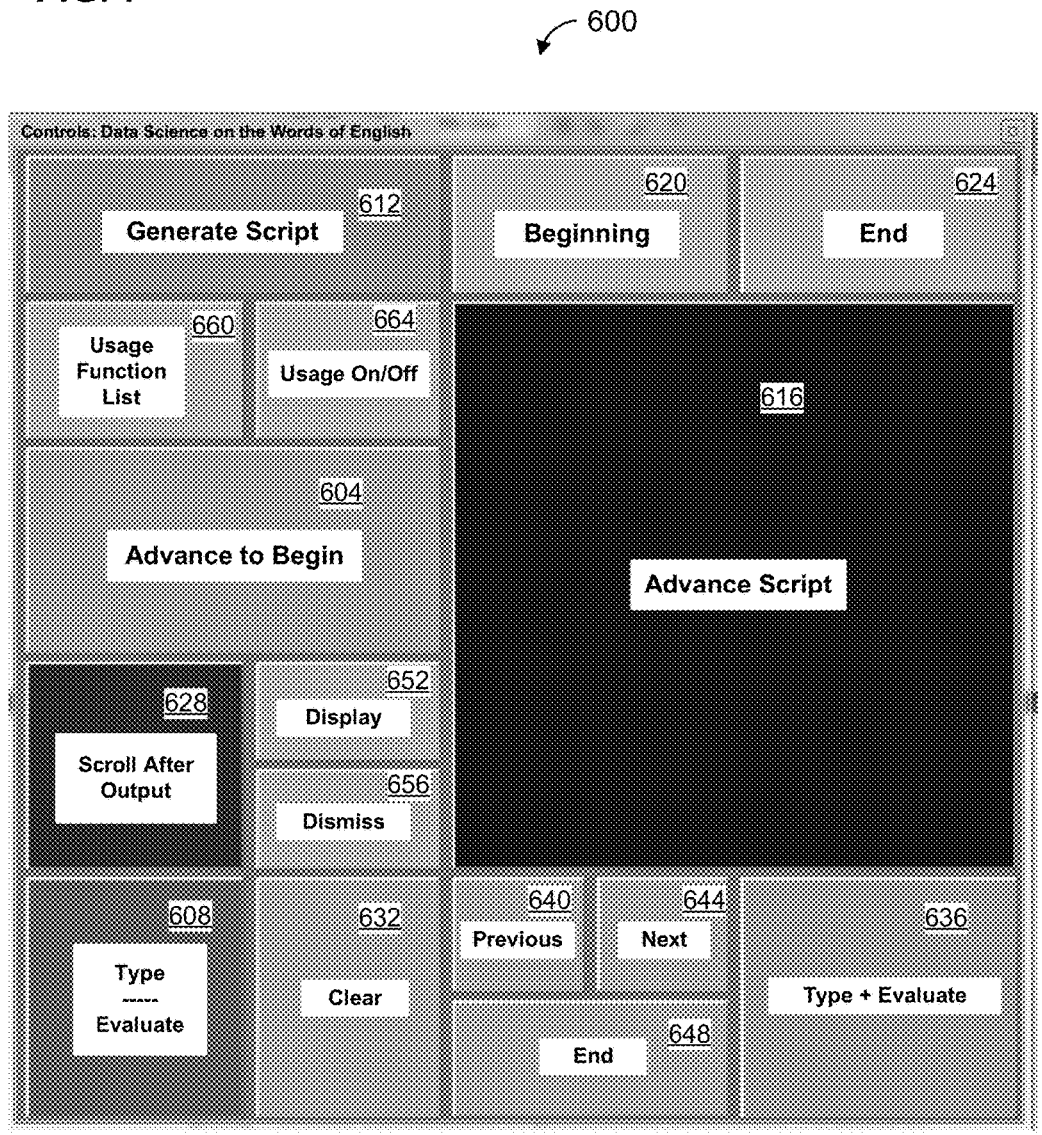
FIG. 7 is an illustration of an example controller display to assist in the performance of a multimedia presentation, according to an embodiment.

FIG. 7 is an illustration of an example controller display 600 generated by the presentation tools module 140 and/or the presentation tools module 192, according to an embodiment. The controller display 600 is for controlling and/or modifying visual content during the multimedia presentation, and in particular, for controlling display of the visual presentation file 308 during performance of the presentation, in some embodiments. In some embodiments, the controller display 600 is for controlling display of the script file during performance of the presentation (e.g., to control which page/slide of the script is current displayed). FIGS. 6A, 6B, and 7 will be described together.

FIG. 6A illustrates the presentation display 500 after a user has selected an "Advance to Begin" button 604 and a type/evaluation button 608. For example, initially, the presentation display 500 may display a title page or slide. When the user presses the "Advance to Begin" button 604, e.g., as prompted by the note 240 (FIG. 5), the presentation display 500 may display a blank page/slide. Then, when the user presses the type/evaluation button 608, e.g., as prompted by the marker 244 (FIG. 5), the presentation display 500 may appear as in FIG. 6A. In an embodiment, the expression 260 may be displayed one character at a time give the appearance that a person is typing the expression 260 into the display 500.

In an embodiment, the presentation tools module 140 and/or the presentation tools module 192 may be configured to display a window 504 that provides usage information regarding the expression 260 when or after the expression is displayed in the window 500. In various embodiments, the window 504 may be displayed until the user takes action to close the window, may be displayed for a defined and/or configurable amount of time (e.g., 5 seconds, 10 seconds, etc.), may be displayed until the expression 260 is evaluated, until a result of the evaluation is displayed, etc. In some embodiments, the presentation tools module 140 and/or the presentation tools module 192 may be configurable to enable display of windows such as the window 504. Configurability may be permitted on an expression-by-expression basis, globally (e.g., display for all expressions or no expressions), etc. The length of time of display of windows such as the window 504 may be configurable, the trigger for ending display of the window 504 may be configurable, etc., in various embodiments.

FIG. 6B illustrates the presentation display 500 after a user has selected the type/evaluation button 608 a second time, e.g., as prompted by the marker 248 (FIG. 5. In an embodiment, the expression 260 may be evaluated by the computational application 144/194, in response to selecting the type/evaluation button 608, to generate the result 264 displayed in the window 500. In another embodiment, the result 264 that is displayed in the window 500 is pre-generated and merely pulled from the authoring notebook and/or from the visual presentation file 312.

In other embodiments, evaluation and display of a result comprises retrieving a web page by evaluating a URL, retrieving a file or document by evaluating a directory listing, etc.

In some embodiments, the presentation tools module 140/192 may be configured to, during the presentation, open a window that covers, at least partially, a presentation display such as the display 500. Similarly, in some embodiments, the presentation tools module 140/192 may be configured to, during the presentation, switch to a display different than a presentation display such as the display 500. For example, in response to an activation of an appropriate button of the controller display 600, the presentation tools module 140/192 may be configured to, during the presentation, switch to a display output of a camera to show, for example, a video of the speaker instead of the presentation display 500, in an embodiment. The presentation tools module 140/192 may be configured to switch back to the presentation display 500 in response to an activation of an appropriate button of the controller display 600, in an embodiment. As another example, in response to an activation of an appropriate button of the controller display 600, the presentation tools module 140/192 may be configured to, during the presentation, switch to a browser display to show, for example, a web page retrieved by the browser, in an embodiment. The presentation tools module 140/192 may be configured to switch back to the presentation display 500 in response to an activation of an appropriate button of the controller display 600, in an embodiment. In some embodiments, the authoring tools module 135/190 may be configured to permit a user to add indicators to an authoring document to indicate when such switches (or such opening of windows) should take place during the presentation and/or which displays should be shown. For example, the authoring tools module 135/190 may be configured to permit a user to add markers to a script to indicate to the presentation tools module 140/192 to which display or window (e.g., camera display, browser display, etc.) the authoring tools module 135/190 should switch in response to an appropriate controller button activation. As another example, the authoring tools module 135/190 may be configured to permit a user to add markers to a script to prompt a user to activate appropriate buttons on the controller to cause the switching (or opening of windows) to take place.

Referring now to FIG. 7, the controller display 600 may provide other controls to assist a speaker (or assistant) during the presentation. For example, a button 612 may be utilized to prompt the presentation tools module 140 and/or the presentation tools module 192 to generate and/or display the script file 308. A button 616 may be utilized to advance to a next page/slide in the script file 308. A button 620 may be utilized to return to a first page/slide in the script file 308. A button 624 may be utilized to advance to a last page/slide in the script file 308. A button 628 may be utilized to position a cursor in the visual display 500 after the last result that is currently displayed. A button 632 may be utilized to clear the visual display 500. A button 636 may be utilized with one press to cause an expression to be added to the display, to evaluate the expression, and to display the result of the evaluation. A button 640 may be utilized to move the presentation slide/page being displayed on the display 500 backwards one slide/page. A button 644 may be utilized to advance the presentation slide/page being displayed on the display 500 forward one slide/page. A button 648 may be utilized to move the presentation slide/page being displayed on the display 500 to the last slide/page. A button 652 may be utilized to cause an informational window, such as the window 504, to be displayed on the display 500. A button 656 may be utilized to cause an informational window, such as the window 504, currently being displayed on the display 500 to be dismissed. A button 660 may be utilized to configure for which expressions/functions/commands, etc. of a computational application informational windows, such as the window 504, will be displayed on the display 500. A button 664 may be utilized to configure the display of informational windows such that either (i) windows for all expressions/functions/commands, etc. will be displayed on the display 500, or (ii) none will be displayed. In other embodiments, other controls may be utilized. In other embodiments, one or more of the controls illustrated in FIG. 7 may be omitted.

In some embodiments, the controller display 600 may be configured by a user. For example, in an embodiment, the presentation tools module 140/192 may permit a user to select from a plurality of predefined configurations of the display 600. For instance, the plurality of predefined configurations may include different sizes and/or shapes optimized for different types of devices on which the display 600 will be shown (e.g., desktop display, laptop display, tablet computer, smartphone, etc.). Additionally, in some embodiments, a user may be permitted to do one or more of the following: choose colors for different buttons, choose from a plurality of predefined color schemes, choose from a plurality of predefined styles, rearrange the placement of buttons, add buttons, remove buttons, etc. In an embodiment, the controller display 600 may include a button (not shown in FIG. 7) that facilitates configuring the controller display 600.

Referring now to FIGS. 5, 6A, 6B, and 7, the presentation display 500 typically may be displayed on a first display device, whereas the script display 400 and the controller display 600 may be displayed on one or more second display devices. In an embodiment, the presentation display 500 typically may be displayed on a first display device, the script display 400 may be displayed on a second display device, and the controller display 600 may be displayed on a third display device. Referring now to FIG. 1, in an embodiment, the presentation display 500 may be displayed on a first display device 124a, the script display 400 may be displayed on a second display device 124b, and the controller display 600 may be displayed on a display device of a computational device separate from the computer 104. For example, the controller display 600 may be displayed on a display of a smart phone, a tablet computer, a laptop computer, etc., which may have a structure similar to that of the computer 104 of FIG. 1. The other computer (e.g., a tablet computer) may transmit, via a wired or wireless connection (e.g., a Bluetooth link, a LAN, etc.) indications of controller button presses to the computer 104, and the computer 104 may appropriately update the script display 400 and/or the presentation display 500 in response to the controller button presses.

Each of the above identified modules and applications can correspond to a set of instructions that, when executed by a processor, cause one or more functions described above to be implemented. These modules need not be implemented as separate software programs, procedures or modules, and thus various subsets of these modules can be combined or otherwise re-arranged in various embodiments. In other embodiments, the memory 120/186 stores additional modules and data structures not described above.

In various examples and embodiments described below, displays and user interfaces are described with reference to the computer 104 of FIGS. 1 and 2 for ease of explanation. In other embodiments, another suitable device different than the computer 104 is utilized, alternatively or additionally, to display displays and user interfaces.

In some embodiments, the authoring tools module 135/190 is configured to generate a transcript document that includes script text from the script document 308 but omits notes, markers, etc. For example, in an embodiment, an item within a pull down menu (when the "actions" menu item 290 (FIG. 3) is selected) may prompt the authoring tools module 135/190 to generate the transcript document. In some embodiments, the authoring tools module 135/190 is configured to generate a visual presentation notebook that includes information from the visual presentation document 312. For example, in an embodiment, an item within a pull down menu (when the "actions" menu item 290 (FIG. 3) is selected) may prompt the authoring tools module 135/190 to generate the visual presentation notebook. The visual presentation notebook may be a notebook document in a format specified by the computational application 144/194 so that a user can view, evaluate expressions within, etc., the visual presentation notebook using the computational application 144/194.

In some embodiments, the presentation tools module 140/192 may include (or may be coupled to) a text-to-speech system, and may be configured to utilize the text-to-speech system (e.g., utilizing computer synthesized speech) generate audio corresponding to a reading of text from the script file 308. Additionally, the presentation tools module 140/192 may be configured to automatically take actions (e.g., button presses, cursor movements, etc.), indicated by markers in the script file 308.

Figure 8:
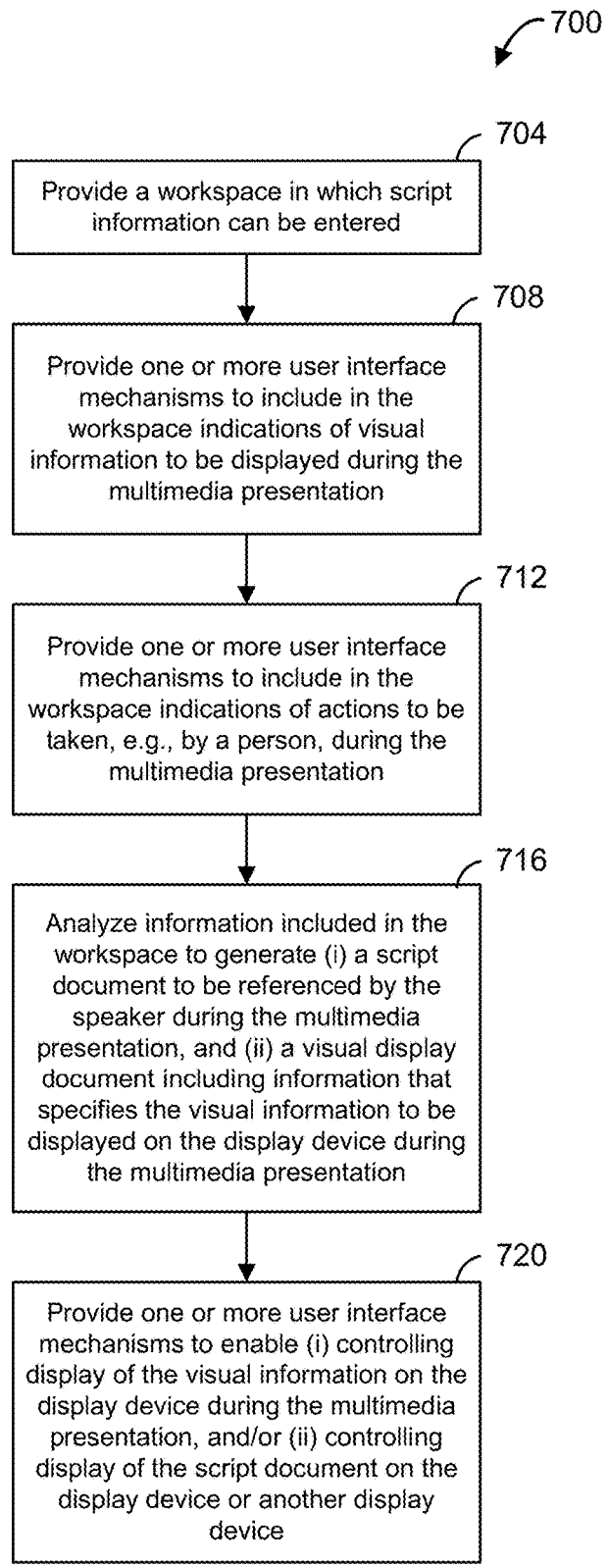
FIG. 8 is flow diagram of an example method for facilitating generation of a multimedia presentation, according to an embodiment.

FIG. 8 is a flow diagram of an example method 700 that may be implemented by the authoring tools module 135/190 and/or the presentation tools module 140/192, at least in some embodiments.

At block 704, a workspace in which script information (i.e., words to be spoken by or referenced by a speaker during a multimedia presentation) can be entered.

At block 708, one or more user interface mechanisms to permit the inclusion, within the workspace, of indications of visual information to be displayed during the multimedia presentation are provided. The indications of visual information may include one or more of (i) graphics information, (ii) video information, (iii) path names to files, (iv) URLs to web pages, (v) expressions, functions, instructions, etc., to be evaluated by an application such as a computational application, a web browser, etc.

At block 712, one or more user interface mechanisms to permit the inclusion, within the workspace, of indications actions to be taken, e.g., by a person, during the multimedia presentation are provided. The indications of actions to be taken may include one or more of notes such as notes 240, markers such as markers 244, 248, etc.

At block 716, information in the workspace is analyzed to generate a script document (e.g., a script file 308) and/or a visual display document (e.g., a visual presentation document 312).

At block 720, one or more user interface mechanisms to enable one or both of (i) controlling display of the visual information on the display device during the multimedia presentation, and/or (ii) controlling display of the script document on the display device or another display device are provided.

In other embodiments, the method 700 may be modified in various ways such as omitting some or all of one or more blocks, adding additional blocks, etc. For example, in one embodiment, block 720 is omitted.

Figure 9:
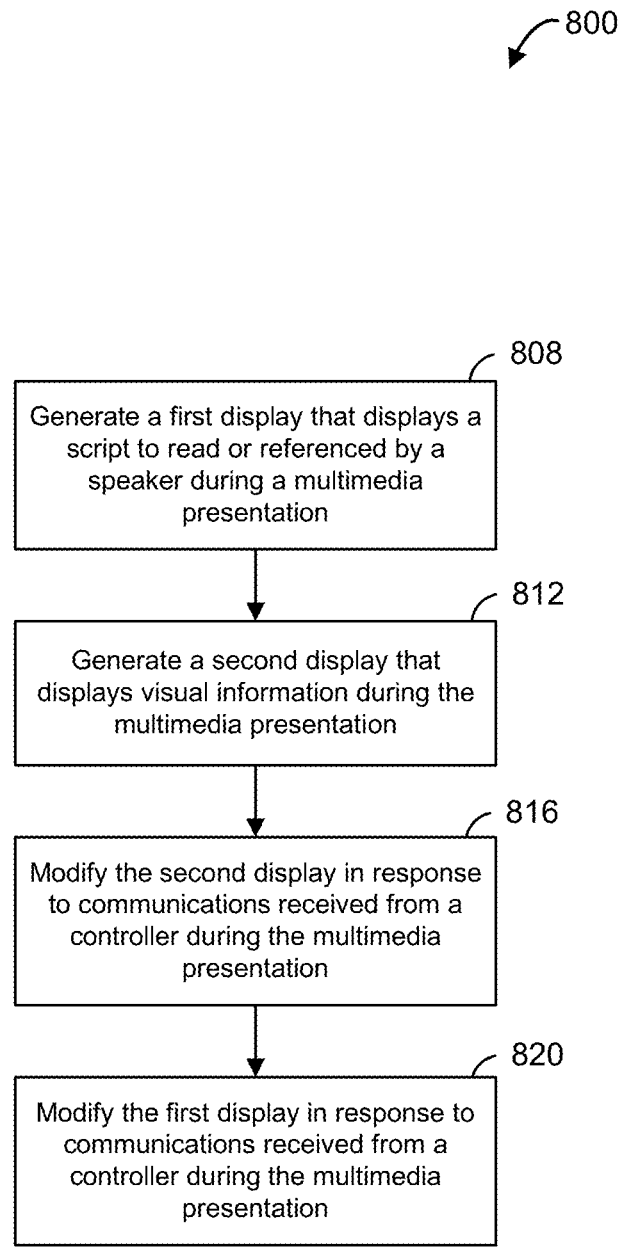
FIG. 9 is flow diagram of an example method for facilitating performance of a multimedia presentation, according to an embodiment.

FIG. 9 is a flow diagram of an example method 800 that may be implemented by the authoring tools module 135/190 and/or the presentation tools module 140/192, at least in some embodiments.

At block 808, a first display is generated, where the first display displays a script to read by or referenced by a speaker during a multimedia presentation.

At block 812, a second display is generated, where the second display displays visual information during the multimedia presentation.

At block 816, the first display is modified in response to communications received from a controller during the multimedia presentation.

At block 820, the second display is modified in response to communications received from a controller during the multimedia presentation.

In other embodiments, the method 800 may be modified in various ways such as omitting some or all of one or more blocks, adding additional blocks, etc. For example, in one embodiment, block 820 is omitted.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable media, or medium, such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for facilitating generation of a multimedia presentation, the method comprising:

providing, using one or more processors, an electronic workspace in which script information can be entered, the script information associated with a script for the multimedia presentation;

providing, using one or more processors, one or more first user interface mechanisms to permit a user to include in the electronic workspace indications of visual information to be displayed during the multimedia presentation;

providing, using one or more processors, one or more second user interface mechanisms to permit the user to include in the workspace indications of actions to be taken during the multimedia presentation;

analyzing, using one or more processors, script information included in the workspace, wherein analyzing the script information included in the workspace includes (a) analyzing the indications of visual information to be displayed during the multimedia presentation, (b) analyzing the indications of actions to be taken during the multimedia presentation, and (c) analyzing respective positions of the indications of visual information within the workspace relative to respective positions of the indications of actions to be taken during the multimedia presentation within the workspace to determine (i) a sequence in which the visual information is to be displayed during the multimedia presentation and (ii) timing of the actions to be taken during the multimedia presentation in relation to the determined sequence in which the visual information is to be displayed; and generating, using one or more processors, based on the analysis of the script information, including the determined sequence in which the visual information is to be displayed during the multimedia presentation and the timing of the actions to be taken during the multimedia presentation, (i) a performance script document to be referenced by a speaker and/or an assistant during the multimedia presentation, and (ii) a visual display document including information that specifies the visual information to be displayed on a display device during the multimedia presentation, wherein the performance script document is generated to include performance information that i) is not included in the visual display document and ii) is not for display to an audience, the performance information specifying at least one of i) words to be spoken by the speaker during the multimedia presentation, and ii) actions to be taken by the speaker and/or the assistant during the multimedia presentation, wherein the performance script document is generated to be linked to the visual display document such that (i) the words to be spoken by the speaker during the multimedia presentation and/or (ii) the actions to be taken by the speaker and/or the assistant during the multimedia presentation are prompted at times that correspond to the determined timing of the actions to be taken during the multimedia presentation in relation to the determined sequence in which the visual information is to be displayed, and wherein at least a portion of the information that specifies the visual information to be displayed on a display device during the multimedia presentation is not included in the performance script document.

2. The method of claim 1, further comprising:

receiving, using one or more processors, text corresponding to words to be spoken by the speaker during the presentation; and including, using one or more processors, the received text in the electronic workspace;

wherein analyzing the script information to generate the performance script document comprises including the received text in the performance script document, and wherein at least some of the received text is not included in the visual display document.

3. The method of claim 1, further comprising:

receiving, using one or more processors, the indications of visual information via the one or more first user interface mechanisms; and including, using one or more processors, the indications of visual information in the electronic workspace;

wherein analyzing the script information to generate the visual display document comprises using the indications of visual information to generate the visual display document so that the visual information indicated by the indications of visual information will be displayed during the multimedia presentation.

4. The method of claim 3, wherein:

the indications of visual information include a software code expression capable of being evaluated by a computational application; and the method further comprises receiving, via the one or more second user interface mechanisms, an indication of when, during the multimedia presentation, the computational application should evaluate the expression; and analyzing the script information to generate the performance script document comprises including in the performance script document a prompt to indicate when the computational application should evaluate the expression, wherein the prompt is not included in the visual display document.

5. The method of claim 3, wherein:

the indications of visual information include a web address; and the method further comprises receiving, via the one or more second user interface mechanisms, an indication of when, during the multimedia presentation, a browser should retrieve a document at the web address; and analyzing the script information to generate the performance script document comprises including in the performance script document a prompt to indicate when the browser should retrieve the document at the web address, wherein the prompt is not included in the visual display document.

6. The method of claim 1, further comprising:

providing, using one or more processors, one or more third user interface mechanisms to enable (i) controlling display of the visual information on the display device during the multimedia presentation, and/or (ii) controlling display of the script document on the display device or another display device.

7. A non-transitory, tangible computer readable media or medium storing machine readable instructions that, when executed by one or more processors, cause the one or more processors to:

provide an electronic workspace in which script information can be entered, the script information associated with a script for a multimedia presentation;

provide one or more first user interface mechanisms to permit a user to include in the electronic workspace indications of visual information to be displayed during the multimedia presentation;

provide one or more second user interface mechanisms to permit the user to include in the workspace indications of actions to be taken during the multimedia presentation; analyze script information included in the workspace, wherein analyzing the script information included in the workspace includes (a) analyzing the indications of visual information to be displayed during the multimedia presentation, (b) analyzing the indications of actions to be taken during the multimedia presentation, and (c) analyzing respective positions of the indications of visual information within the workspace relative to respective positions of the indications of actions to be taken during the multimedia presentation within the workspace to determine (i) a sequence in which the visual information is to be displayed during the multimedia presentation and (ii) timing of the actions to be taken during the multimedia presentation in relation to the determined sequence in which the visual information is to be displayed; and generate, based on the analysis of the script information, including the determined sequence in which the visual information is to be displayed during the multimedia presentation and the timing of the actions to be taken during the multimedia presentation, (i) a performance script document to be referenced by a speaker and/or an assistant during the multimedia presentation, and (ii) a visual display document including information that specifies the visual information to be displayed on a display device during the multimedia presentation, wherein the performance script document is generated to include performance information that i) is not included in the visual display document and ii) is not for display to an audience, the performance information specifying at least one of i) words to be spoken by the speaker during the multimedia presentation, and ii) actions to be taken by the speaker and/or the assistant during the multimedia presentation, wherein the performance script document is generated to be linked to the visual display document such that (i) the words to be spoken by the speaker during the multimedia presentation and/or (ii) the actions to be taken by the speaker and/or the assistant during the multimedia presentation are prompted at times that correspond to the determined timing of the actions to be taken during the multimedia presentation in relation to the determined sequence in which the visual information is to be displayed, and wherein at least a portion of the information that specifies the visual information to be displayed on a display device during the multimedia presentation is not included in the performance script document.

8. The computer readable media or medium of claim 7, further storing machine readable instructions that, when executed by one or more processors, cause the one or more processors to:

receive text corresponding to words to be spoken by the speaker during the presentation; and include the received text in the electronic workspace;

wherein analyzing the script information to generate the performance script document comprises including the received text in the performance script document, and wherein at least some of the received text is not included in the visual display document.

9. The computer readable media or medium of claim 7, further storing machine readable instructions that, when executed by one or more processors, cause the one or more processors to:

receive the indications of visual information via the one or more first user interface mechanisms; and include the indications of visual information in the electronic workspace;

wherein analyzing the script information to generate the visual display document comprises using the indications of visual information to generate the visual display document so that the visual information indicated by the indications of visual information will be displayed during the multimedia presentation.

10. The computer readable media or medium of claim 9, wherein:

the indications of visual information include an expression capable of being evaluated by a computational application; and the computer readable media or medium further stores machine readable instructions that, when executed by one or more processors, cause the one or more processors to receive, via the one or more second user interface mechanisms, an indication of when, during the multimedia presentation, the computational application should evaluate the expression; and analyzing the script information to generate the performance script document comprises including in the performance script document a prompt to indicate when the computational application should evaluate the expression, wherein the prompt is not included in the visual display document.

11. The computer readable media or medium of claim 9, wherein:

the indications of visual information include a web address; and the computer readable media or medium further stores machine readable instructions that, when executed by one or more processors, cause the one or more processors to receive, via the one or more second user interface mechanisms, an indication of when, during the multimedia presentation, a browser should retrieve a document at the web address; and analyzing the script information to generate the performance script document comprises including in the performance script document a prompt to indicate when the browser should retrieve the document at the web address, wherein the prompt is not included in the visual display document.

12. The computer readable media or medium of claim 7, further storing machine readable instructions that, when executed by one or more processors, cause the one or more processors to:

provide one or more third user interface mechanisms to enable (i) controlling display of the visual information on the display device during the multimedia presentation, and/or (ii) controlling display of the script document on the display device or another display device.

* * * * *